US010207646B2

(12) United States Patent
Oh

(10) Patent No.: US 10,207,646 B2
(45) Date of Patent: Feb. 19, 2019

(54) VEHICLE FRONT CAMERA MODULE INTEGRATED WITH REARVIEW MIRROR

(71) Applicant: LG Electronics Inc., Seoul (KR)

(72) Inventor: Jaeheon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 15/018,420

(22) Filed: Feb. 8, 2016

(65) Prior Publication Data

US 2016/0229346 A1 Aug. 11, 2016

(30) Foreign Application Priority Data

Feb. 10, 2015 (KR) .................. 10-2015-0020417

(51) Int. Cl.
| | |
|---|---|
| *B62D 25/00* | (2006.01) |
| *B60R 1/12* | (2006.01) |
| *B60R 11/04* | (2006.01) |
| *B60R 1/04* | (2006.01) |
| *H04N 5/225* | (2006.01) |

(Continued)

(52) U.S. Cl.
CPC .............. *B60R 1/12* (2013.01); *B60R 1/04* (2013.01); *B60R 11/04* (2013.01); *H04N 5/2251* (2013.01); *H04N 5/2252* (2013.01); *H04N 5/2253* (2013.01); *H04N 5/2257* (2013.01); *H04N 13/239* (2018.05); *B60R 2011/0026* (2013.01); *H04N 2213/001* (2013.01)

(58) Field of Classification Search
CPC .. B60R 1/12; B60R 11/04; B60R 1/04; B60R 2011/0026; H04N 13/0239; H04N 5/2257; H04N 5/2251; H04N 5/2253; H04N 5/2252
See application file for complete search history.

(56) References Cited

U.S. PATENT DOCUMENTS 7,719,408 B2 * 5/2010 DeWard .................. B60R 11/04
340/425.5
2002/0135468 A1 9/2002 Bos et al.
(Continued)

FOREIGN PATENT DOCUMENTS

CN 202208269 U 5/2012
CN 203543808 U 4/2014
(Continued)

*Primary Examiner* — Sathyanaraya V Perungavoor
*Assistant Examiner* — Howard D Brown, Jr.
(74) *Attorney, Agent, or Firm* — Birch, Stewart, Kolasch & Birch, LLP

(57) ABSTRACT

A vehicle front camera module integrated with a rearview mirror includes a windshield bracket module fixed to a central upper end of a windshield of a vehicle, a camera module fixed to the windshield bracket module and at which a pair of lenses for taking forward images of the vehicle are disposed to be laterally spaced apart from each other, and a rearview mirror coupled to the windshield bracket module through a supporter which is coupled to the windshield bracket module in front of the pair of lenses and extending downward so as not to interfere with respective angles of view of the pair of lenses. This arrangement enables the camera module to have a compact design with improved visibility for a safe driving experience.

20 Claims, 11 Drawing Sheets

(51) Int. Cl.
*H04N 13/239* (2018.01)
*B60R 11/00* (2006.01)

(56) References Cited

U.S. PATENT DOCUMENTS

| | | | | |
|---|---|---|---|---|
| 2007/0153085 A1* | 7/2007 | Chang | ............... | B60R 1/00 |
| | | | | 348/148 |
| 2009/0295181 A1* | 12/2009 | Lawlor | ............... | B60R 1/12 |
| | | | | 296/1.11 |
| 2014/0247390 A1* | 9/2014 | Ohsumi | ............... | B60R 11/04 |
| | | | | 348/373 |
| 2014/0313337 A1* | 10/2014 | Devota | ............... | B60R 11/04 |
| | | | | 348/148 |
| 2016/0006911 A1* | 1/2016 | Kimura | ............... | H04N 5/2252 |
| | | | | 348/47 |

FOREIGN PATENT DOCUMENTS

| | | |
|---|---|---|
| CN | 103958276 A | 7/2014 |
| DE | 10 2009 027 512 A1 | 1/2011 |
| JP | 11-78737 A | 3/1999 |
| JP | 2004-25930 A | 1/2004 |
| JP | 2007-22495 A | 2/2007 |
| JP | 2015-24821 A | 2/2015 |
| WO | 2004-82829 A | 3/2004 |
| WO | WO 2011/030958 A1 | 3/2011 |

* cited by examiner

VEHICLE FRONT CAMERA MODULE INTEGRATED WITH REARVIEW MIRROR

CROSS-REFERENCE TO RELATED APPLICATION

This application claims the priority benefit of Korean Patent Application No. 10-2015-0020417, filed on Feb. 10, 2015 in the Korean Intellectual Property Office, the disclosure of which is incorporated herein by reference.

BACKGROUND OF THE INVENTION

1. Field of the invention

The present invention relates to a vehicle front camera module integrated with a rearview mirror, and more particularly, to a vehicle front camera module integrated with a rearview mirror, in which a camera module for taking a forward image of a vehicle in a direction of travel and a rearview mirror for displaying the image captured by the camera module or for reflecting and projecting a rear view image of the vehicle to a driver or passenger depending on a user selection are integrally incorporated so as to enable a compact design, wherein the rearview mirror is disposed so as not to interfere with viewing angles of the camera module.

2. Description of the Related Art

A vehicle is typically provided with side mirrors installed at both sides of a vehicle body and a rearview mirror installed at a front and upper position of a vehicle interior in order to assure a driver's clear field of view during forward and rearward traveling.

The recent trend is that a black box device equipped with a camera for taking a forward image of a vehicle in a direction of travel is provided at a front position of a vehicle interior so as to analyze causes of accidents occurring during driving of the vehicle or parking of the vehicle using images stored in the black box device.

The camera, which may be considered as an essential component for taking the overall situation in front of a vehicle, is typically fixed to an upper area of a windshield via an additional coupling element in order to assure a sufficient field of view.

The black box device may be provided with a display unit for displaying an image captured by the camera depending on a user selection.

In such a conventional vehicle which is constructed in the above manner, since a rearview mirror and a black box device are discretely disposed at separate positions of a windshield and thus interfere with a user's field of view during driving, they may cause an accident during driving.

Furthermore, since a camera of the black box device serves only to take and store a forward image of a vehicle in a direction of travel but does not serve to analyze a specific object in a captured image or to detect risk factors, an application range of the device is limited.

In addition, although a black box device should be inevitably provided with a display unit as described above, a front area of a vehicle interior corresponding to a front area of a driver's seat and a front passenger's seat should be previously provided with various observation instruments such as an instrument cluster assembly, a navigation device and an AVN system which are inevitably required for reliable driving, thus making it difficult to assure safe driving.

SUMMARY OF THE INVENTION

Therefore, the present invention has been made in view of the above problems, and it is an object of the present invention to provide a vehicle front camera module integrated with a rearview mirror, in which a camera module for taking a forward image of a vehicle in a direction of travel and a rearview mirror for displaying the image captured by the camera module or for reflecting and projecting a rear view image of the vehicle to a driver or passenger depending on a user selection are integrally incorporated so as to enable a compact design, wherein the rearview mirror is disposed so as to interfere with neither a user's field of view nor angles of view of the camera module.

In accordance with an aspect of the present invention, the above and other objects can be accomplished by the provision of a vehicle front camera module integrated with a rearview mirror, including a windshield bracket module fixed to a central upper end of a windshield of a vehicle, a camera module fixed to the windshield bracket module and at which a pair of lenses for taking forward images of the vehicle are disposed to be laterally spaced apart from each other, and a rearview mirror coupled to the windshield bracket module through a supporter which is coupled to the windshield bracket module in front of the pair of lenses and extending downward so as not to interfere with respective angles of view of the pair of lenses.

The camera module may include the pair of first and second lenses, and may further include first and second light shield members disposed in front of the first and second lenses to define angles of view of the first and second lenses, respectively, while blocking introduction of light from outside of the angles of view. The supporter may extend between the first and second light shield members and is fixed at an upper end thereof to the windshield bracket module.

The windshield bracket module may include a windshield bracket, wherein the upper end of the supporter may be fixed to the windshield bracket, together with the camera module.

The windshield bracket module may include a light shield bracket to which the first and second light shield members are fixed, wherein the upper end of the supporter may be fixed to the light shield bracket.

The upper end of the supporter may be disposed behind front ends of the first and second light shield members.

The vehicle front camera module may further include an integral cover coupled to the windshield bracket module to conceal the camera module and the upper end of the supporter from a vehicle interior, wherein the upper end of the supporter may be received in the integral cover and coupled to the windshield bracket module.

The vehicle front camera module may further include a guide member formed at a lateral side of the integral cover to guide connection between the supporter and the rearview mirror.

The rearview mirror may include a display panel for displaying an image captured by the camera module.

The rearview mirror may be coupled to a lower end of the supporter to allow adjustment of a reflection angle of the rearview mirror, and may be supplied with power through a single wire connected to a main power supply of the vehicle, the single wire being connected to the camera module and then being connected to the display panel after passing through the supporter and a ball joint.

In accordance with another aspect of the present invention, the above and other objects can be accomplished by the provision of a vehicle front camera module integrated with a rearview mirror, including a windshield bracket module fixed to a central upper end of a windshield of a vehicle, a camera module fixed to the windshield bracket module and at which a pair of lenses for taking forward images of the vehicle are disposed to be laterally spaced apart from each other, an integral cover coupled to the windshield bracket to conceal the camera module from a vehicle interior, and a rearview mirror coupled to the integral cover through a supporter.

The vehicle front camera module may further include a supporter coupling end part for coupling the supporter to a lower portion of the integral cover.

The rearview mirror may be foldably provided at a lower surface of the integral cover.

The integral cover may include a reception member formed at the lower surface thereof at which the rearview mirror is seated when the rearview mirror is folded.

The rearview mirror may be disposed behind the integral cover.

The rearview mirror may be coupled to the integral cover in such a manner as to allow adjustment of a reflection angle of the rearview mirror by user manipulation.

The vehicle front camera module may further include a rearview mirror moving unit for moving the rearview mirror.

The vehicle front camera module may further include a display panel for displaying an image captured by the camera module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well known to one of ordinary skill in the relevant art has generally been omitted for the sake of brevity. The accompanying drawings are used to assist in easy understand of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present.

A singular representation may include a plural representation unless it represents a definitely different meaning from the context.

Terms such as "includes" or "has" are used herein and should be understood that they are intended to indicate presence of several components, functions or steps, disclosed in the specification, and it is also understood that more or fewer components, functions, or steps may likewise be utilized.

Figure 1:
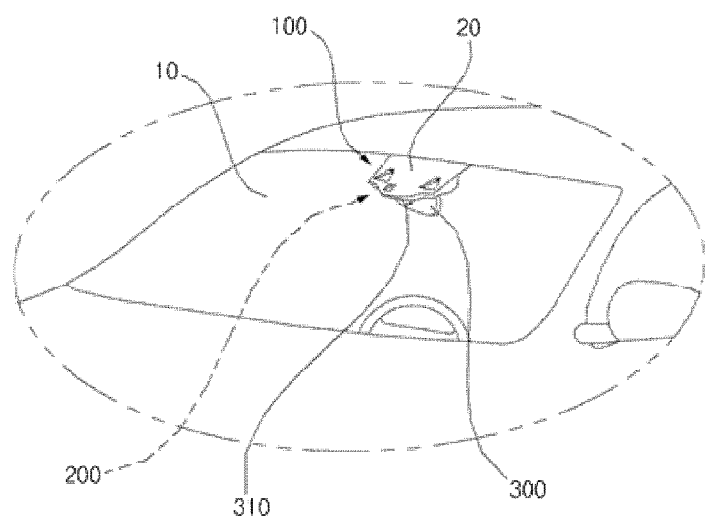
FIG. 1 is a perspective view illustrating a vehicle front camera module integrated with a rearview mirror according to a preferred embodiment of the present invention, which is installed at an inner surface of a windshield.
Figure 2:
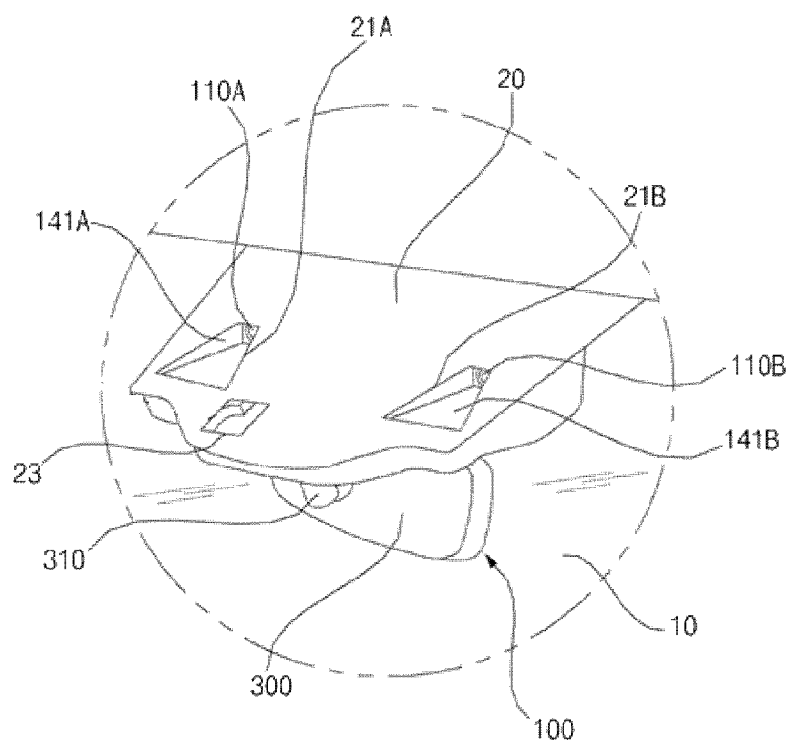
FIG. 2 is an enlarged view of a part of FIG. 1.
Figure 3:
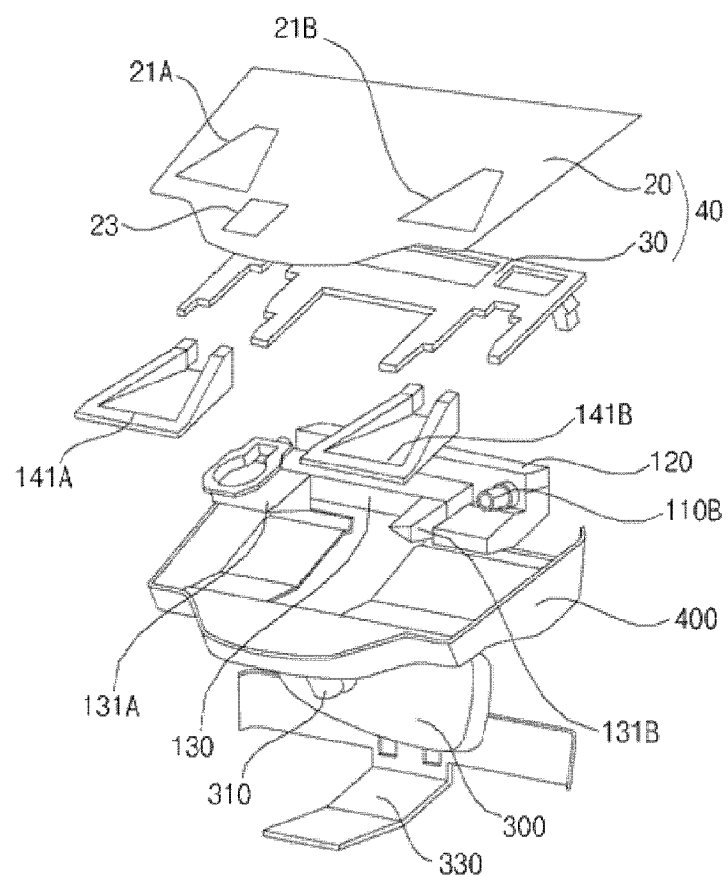
FIG. 3 is an exploded perspective view illustrating the vehicle front camera module integrated with a rearview mirror according to the preferred embodiment of the present invention.
Figure 4A:
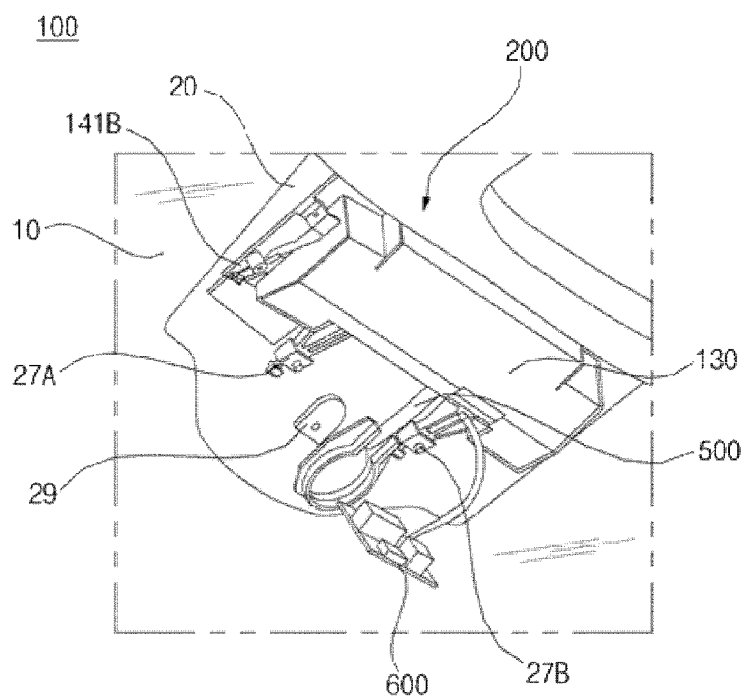
FIGS. 4A and 4B are perspective views illustrating different installed states of a camera module and a rearview mirror to a windshield bracket.
Figure 4B:
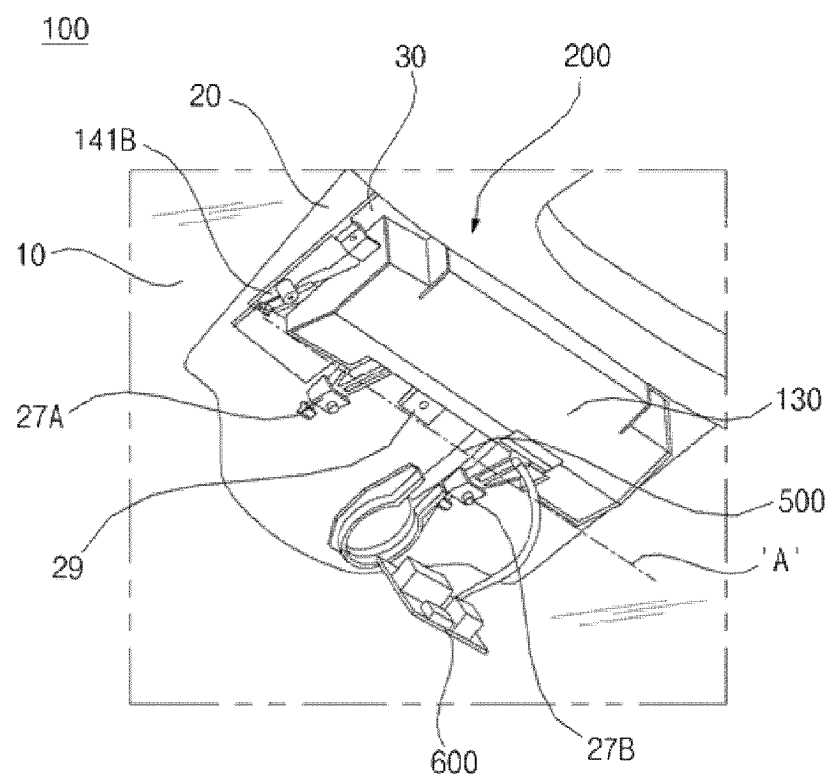
Figure 5A:
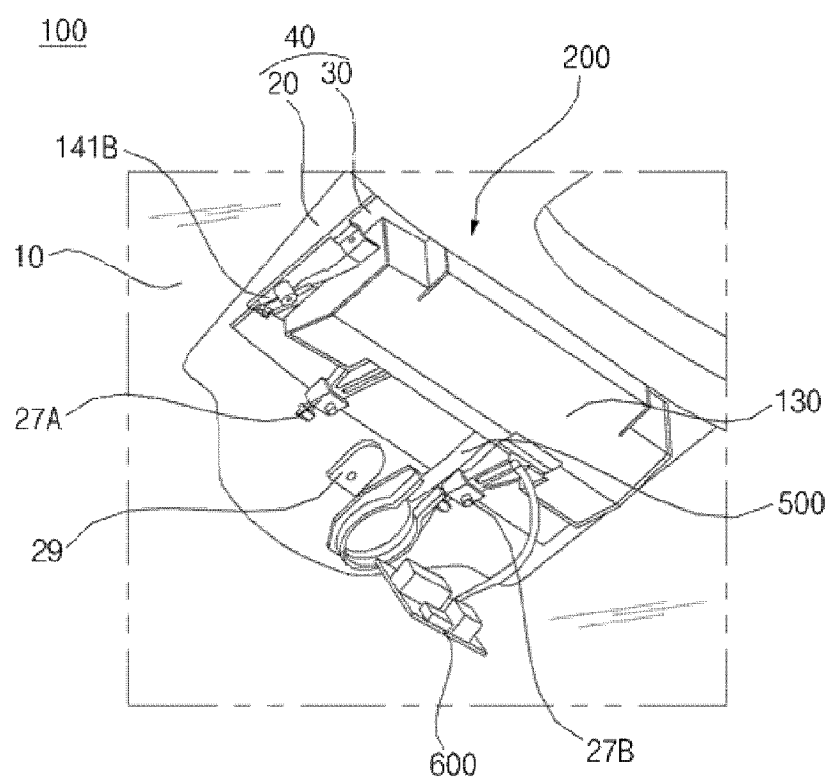
FIGS. 5A and 5B are perspective views illustrating different installed states of a camera module and a rearview mirror to a light shield bracket.
Figure 5B:
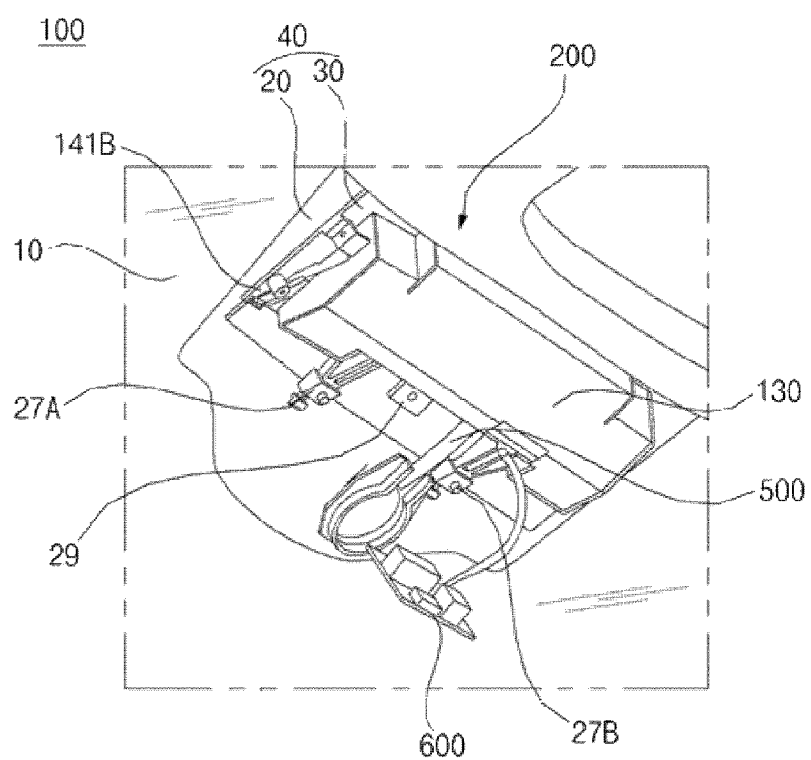
Figure 6A:
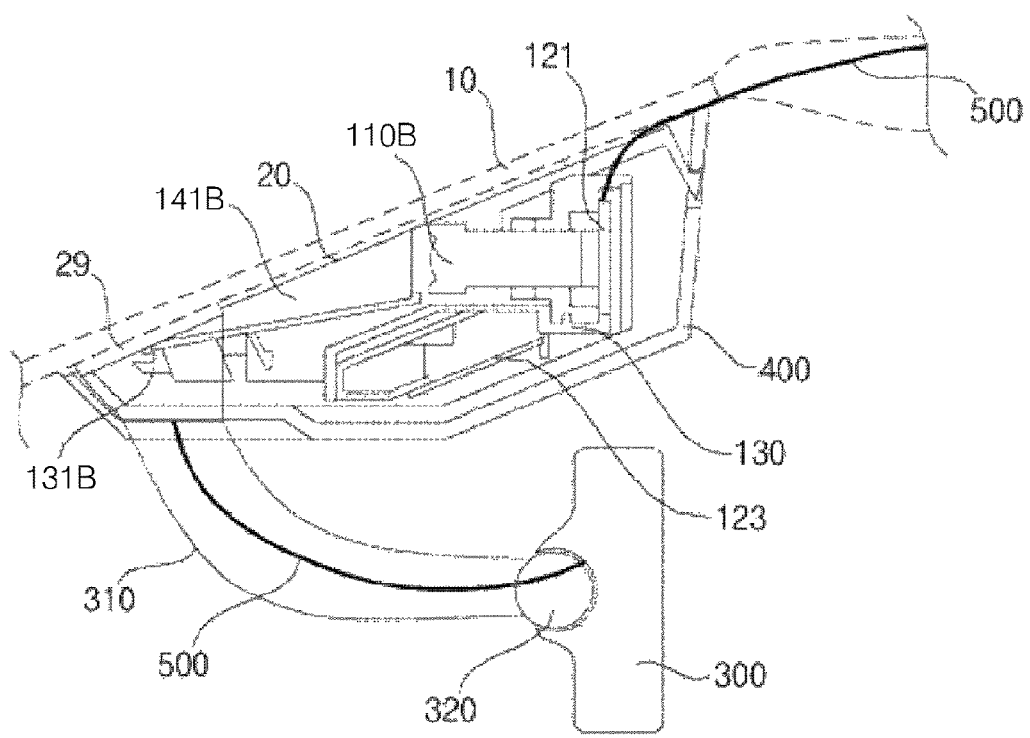
FIGS. 6A and 6B are a side cross-sectional view of FIGS. 4A and 5A and a side cross-sectional view of FIGS. 4B and 5B, respectively.
Figure 6B:
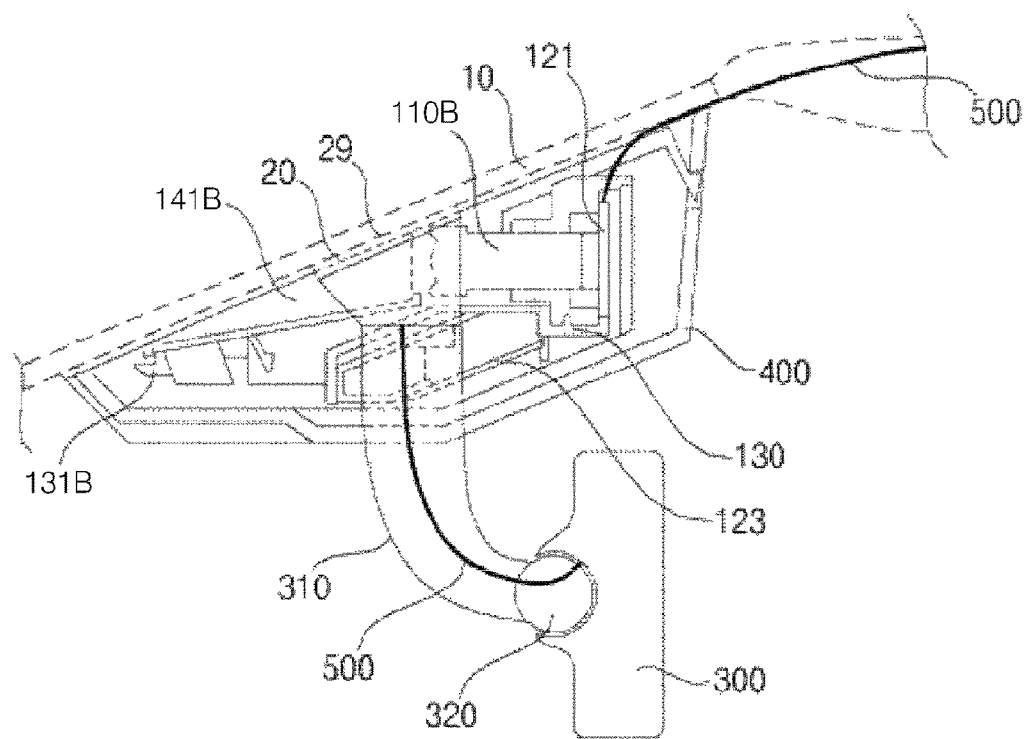

FIG. 1 is a perspective view illustrating a vehicle front camera module integrated with a rearview mirror according to a preferred embodiment of the present invention, which is installed at an inner surface of a windshield. FIG. 2 is an enlarged view of a part of FIG. 1. FIG. 3 is an exploded perspective view illustrating the vehicle front camera module integrated with a rearview mirror according to the preferred embodiment of the present invention. FIGS. 4A and 4B are perspective views illustrating different installed states of a camera module and a rearview mirror to a windshield bracket. FIGS. 5A and 5B are perspective views illustrating different installed states of a camera module and a rearview mirror to a light shield bracket. FIGS. 6A and 6B are a side cross-sectional view of FIGS. 4A and 5A and a side cross-sectional view of FIGS. 4B and 5B, respectively.

As illustrated in FIGS. 1 to 6B, a vehicle front camera module assembly 100 according to a preferred embodiment of the present invention includes a windshield bracket module 40 fixed to the central upper end of a windshield 10 of a vehicle facing toward a vehicle interior, a camera module 200 fixed to the windshield bracket module 40 and at which a pair of lenses 110A and 110B for taking forward images of the vehicle are disposed to be laterally spaced apart from each other, and a rearview mirror 300 coupled to the windshield bracket module 40 through a supporter 310 which is fixed to the windshield bracket module 40 in front of the pair of lenses 110A and 110B and extends downward so as not to interfere with respective angles of view of the pair of lenses 110A and 110B.

In this embodiment, the windshield bracket module 40 may include a windshield bracket 20 which is a plate and which is securely attached at a portion thereof to an inner surface of the windshield 10 facing toward the vehicle interior by means of a high intensity adhesive member, and a light shield bracket 30 to which a pair of light shield members 141A and 141B (which will be described later) are fixed.

Specifically, the windshield bracket 20 includes a pair of lens converging holes 21A and 21B which allow external light to be converged through the pair of lenses 110A and 110B of the camera module 200. The pair of lens converging holes 21A and 21B may be configured to have a width increasing toward the front of the windshield 10.

For simplicity, the pair of lenses 110A and 110B, which are components of the camera module 200, will be classified into a first lens 110A and a second lens 110B in the following description.

Furthermore, the windshield bracket 20 may be provided with a pair of fixing ends 27A and 27B to which the camera module 200 is securely fixed through the light shield bracket 30. Specifically, the fixing ends 27A and 27B may be formed at an inner surface of the windshield bracket 20 which is exposed to the vehicle interior. The fixing ends 27A and 27B are formed with respective fitting grooves, respectively, in which front ends of the light shield bracket 30 to which the camera module 200 is coupled are partially fitted. After the front ends of the light shield bracket 30 are partially fitted, the front ends of the light shield bracket 30 are securely coupled thereto by means of fastening elements such as screws.

The windshield bracket 20 may be provided with a sensor hole 23 through which a sensor 600 and the like for measuring outside weather of a vehicle, etc., is exposed to the outside. The sensor 600 may be embodied as a rain sensor for detecting an amount of rain in case of rain or an acoustic or vibration sensor for detecting sound or vibration generated at an outer surface of the windshield 10. As illustrated in FIGS. 3 to 6B, the camera module 200 may include a mounting part 120 to which the pair of lenses are coupled, and a camera holder 130 to which the mounting part 120 is coupled and which is coupled to the light shield bracket 30 of the windshield bracket module 40. The light shield bracket 30 is provided with a pair of light shield members 141A and 141B disposed between the camera holder 130 and the windshield 10, which confine angles of view of the pair of lenses 110A and 110B to predetermined ranges, respectively, while blocking introduction of light from outside of the range.

The pair of light shield members 141A and 141B are disposed to precisely coincide with the pair of lens converging holes 21A and 21B, and, as such, the pair of light shield members 141A and 141B define tunnels of a predetermined shape extending from the pair of lens converging holes 21A and 21B to the first and second lenses 110A and 110B while blocking introduction of light from the outside of the tunnels.

The light shield bracket 30 is disposed above the mounting part 120 including the first and second lenses 110A and 110B to cover the mounting part 120. The light shield bracket 30 is closely coupled at an upper surface thereof to a lower surface of the windshield bracket 20 and is closely coupled at a lower surface thereof to an upper surface of the camera holder 130.

When the light shield bracket 30 is closely coupled to the upper surface of the camera holder 130, the pair of light shield members 141A and 141B extend forward from the front ends of the body of the camera holder 130 by a predetermined length to define an approximate "U" shape. The body of the camera holder 130 may be provided with shield members 131A and 131B which extend forward by a predetermined length in the same manner to support the respective light shield members 141A and 141B from below.

Although the vehicle front camera module assembly 100 for taking a forward image of a vehicle in a direction of travel may include a single lens, the vehicle front camera module assembly 100 according to the preferred embodiment of the present invention includes the first and second lenses 110A and 110B which are disposed at both lateral sides of the mounting part 120 to be spaced apart from each other so as to concurrently create images of a front object positioned the same distance from the first and second lenses. Consequently, three-dimensional state information of the object may be promptly obtained through analysis of the images. However, it should be noted that the present invention is not necessarily limited thereto.

As illustrated in FIGS. 6A and 6B, the camera module 200 may further include image sensors 121 disposed behind the pair of lenses 110A and 110B, respectively, which are composed of a charge-coupled device (CCD) in which a large number of photodiodes are integrated to create predetermined images by electrons generated from an amount of light converged through the pair of lenses 110A and 110B, and an image processing board 123 for processing the images created by the image sensors 121 to output the images through a display member such as the rearview mirror 300.

The image processing board 123 is disposed in the camera holder 130 such that it extends in a lateral direction.

As illustrated in FIGS. 1 to 6B, the rearview mirror 300 is integrally coupled to the windshield bracket module 40 via the supporter 310, together with the camera module 200.

More specifically, as illustrated in FIGS. 6A and 6B, the rearview mirror 300 is integrally coupled to the windshield bracket 20 of the windshield bracket module 40 via the supporter 310, together with the camera module 200. Here, the rearview mirror 300 is preferably positioned approximately below the camera module 200.

Since the vehicle front camera module assembly 100 having an integrated rearview mirror according to the preferred embodiment of the present invention includes the first and second lenses 110A and 110B, the embodiment properly positions the supporter 310 in order to compactly position the camera module 200 and the rearview mirror 300 in a confined space.

One feature of the vehicle front camera module assembly 100 having an integrated rearview mirror according to the preferred embodiment of the present invention resides in the fact that the camera module 200 and the rearview mirror 300 are concurrently coupled to the windshield bracket module 40 such that the rearview mirror 300 does not interfere with forward images of a vehicle in a direction of travel which are converged through the first and second lenses 110A and 110B, that is, the rearview mirror 300 does not interfere with angles of view of the pair of lenses 110A and 110B.

In order to realize this feature, the present invention may be embodied as first and second embodiments which will be described later.

As illustrated in FIGS. 6A and 6B, the vehicle front camera module assembly 100 having an integrated rearview mirror according to the first embodiment of the present invention is constructed in such a manner that the supporter 310 is directly coupled to the windshield bracket 20 of the windshield bracket module 40.

The vehicle front camera module assembly 100 having an integrated rearview mirror according to the first embodiment of the present invention may further be embodied in the following various manners depending on an installation position of the supporter 310.

For example, the first embodiment of the present invention may be embodied in such a manner that the supporter 310 is coupled to the region of the windshield bracket 20 positioned just before the center point between the first and second lenses 110A and 110B and extends downward, as illustrated in FIGS. 6A and 6B. Alternatively, the first embodiment of the present invention may also be embodied in such a manner that the supporter 310 is coupled to the windshield bracket 20 between the pair of light shield members 141A and 141B provided at the first and second lenses 110A and 110B, respectively, and extends between the pair of light shield members 141A and 141B.

Although not shown in the drawings, the upper end of the supporter 310 may be coupled to a supporter coupling end part 29 formed at a lower surface of the windshield bracket 20 in various manners. For example, the supporter coupling end part 29 is coupled to the lower surface of the windshield bracket 20 while protruding downward, and the upper end of the supporter 310 is slidably coupled to the lower surface while accommodating the supporter coupling end part 29. The upper end of the supporter 310 may be fixedly coupled to the supporter coupling end part 29 by means of fastening elements such as screws.

In the vehicle front camera module assembly 100 having an integrated rearview mirror according to the first embodiment of the present invention as described above, the supporter 310 extends in a forward direction of the first and second lenses 110A and 110B so as to be directly coupled to the windshield bracket 20 of the windshield bracket module 40. Specifically, the supporter 310 extends between the pair of light shield members 141A and 141B so as not to interfere with angles of view of the first and second lenses 110A and 110B, and is coupled to the windshield bracket 20, thus enabling the camera module 200 to have a more compact arrangement without functional deterioration.

The vehicle front camera module assembly 100 having an integrated rearview mirror according to the present invention may further include an integral cover 400 coupled to the windshield bracket 20 to conceal the appearance of the camera module 200 and the upper end of the supporter 310 from a vehicle interior. The integral cover 400 together with the windshield bracket module 40 provide a housing for receiving the camera module 200.

As described above, the integral cover 400 serves to enhance integrity of the vehicle front camera module assembly 100 having an integrated rearview mirror according to the preferred embodiment of the present invention by hiding the camera module 200 and the upper end of the supporter 310.

The upper end of the supporter 310 may be stably accommodated in the integral cover 400 and may be coupled to the windshield bracket 20, as described above.

The integral cover 400 may be provided at a lateral side thereof with a cover member 330 for covering a connection between the supporter 310 and the rearview mirror 300. The cover member 330 may be detachably coupled to the integral cover 400. More specifically, the cover member 330 may be detached from the integral cover 400 when the supporter 310 is being coupled to the windshield bracket 20, and may be again coupled to the integral cover 400 after coupling of the supporter 310 to the windshield bracket 20.

However, the supporter 310 assisting in coupling of the rearview mirror 300 does not necessarily need to be directly coupled to the windshield bracket 20. The supporter 310 may be, of course, directly coupled to the light shield bracket 30 as in the case of the second embodiment.

More specifically, as illustrated in FIG. 5B, the vehicle front camera module assembly 100 having an integrated rearview mirror according to the second embodiment of the present invention may be constructed in such a manner that one end of the supporter 310 is coupled to the supporter coupling end part 29 provided on the light shield bracket 30 to which the first and second light shield members 141A and 141B adapted to define angles of view of the first and second lenses 110A and 110B of the camera module 200 while blocking introduction of light from outside of the angles of view.

Since there is a risk that the end of the supporter 310 interferes with the angles of view of the first and second lenses 110A and 110B, the end of the supporter 310 is preferably positioned between the first and second light shield members 141A and 141B and behind the front ends of the first and second light shield members 141A and 141B. In other words, referring to FIG. 4B, assuming that line A is a reference line extending through the front ends of the first and second light shield members 141A and 141B, the end of the supporter 310 may be positioned behind line A.

Figure 7:
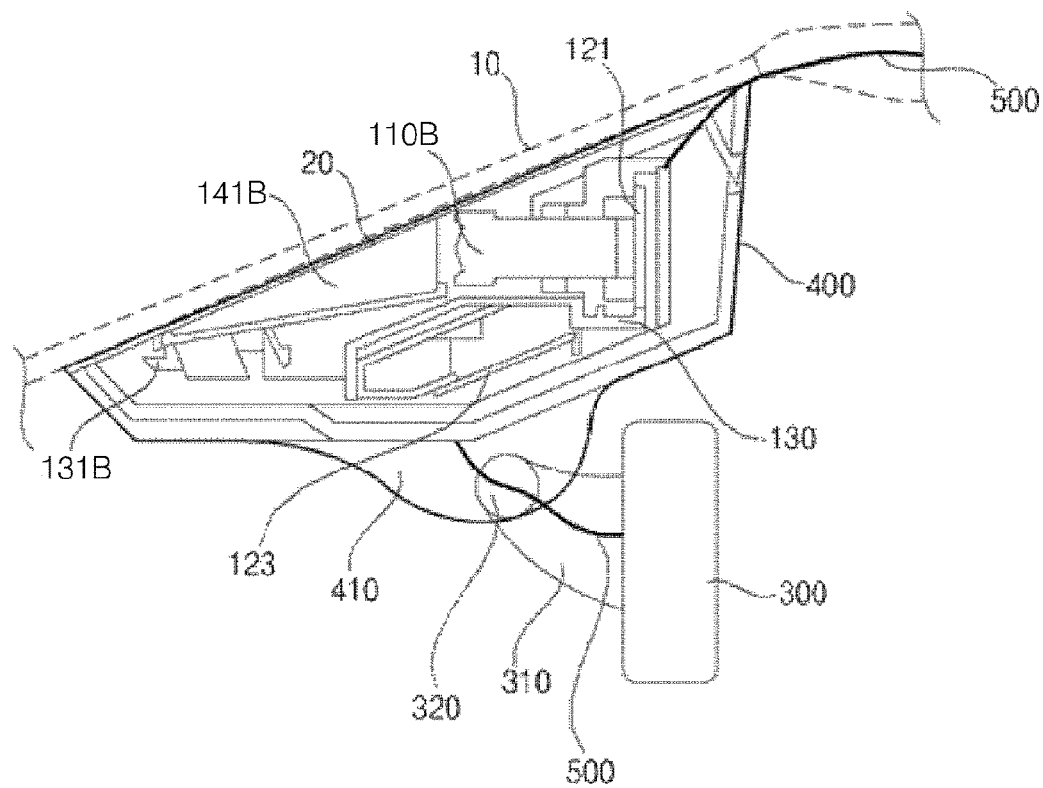
FIG. 7 is a side cross-sectional view illustrating the rearview mirror coupled to the integral cover.
Figure 8:
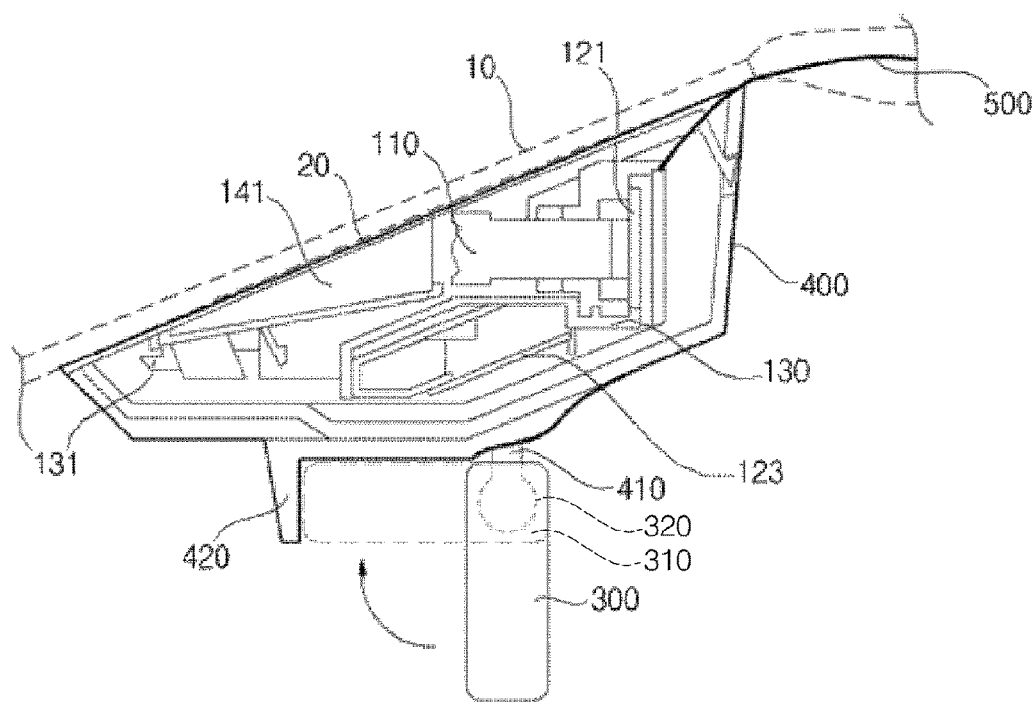
FIG. 8 is a side cross-sectional view illustrating the rearview mirror foldably coupled to the front camera module.

FIG. 7 is a side cross-sectional view illustrating the rearview mirror coupled to the integral cover, and FIG. 8 is a side cross-sectional view illustrating the rearview mirror foldably coupled to the front camera module.

The vehicle front camera module assembly 100 having an integrated rearview mirror according to the present invention may also be embodied as a third embodiment in addition to the above-described first and second embodiments.

The vehicle front camera module assembly 100 having an integrated rearview mirror according to the first and second embodiments of the present invention are constructed in such a manner that the supporter 310 for coupling the rearview mirror 300 is directly coupled to the windshield bracket module 40 whereas the third embodiment is constructed in such a manner that the rearview mirror 300 is directly coupled to the integral cover 400 as described hereinafter.

As illustrated in FIGS. 7 and 8, the vehicle front camera module assembly 100 having an integrated rearview mirror according to the third embodiment of the present invention may include the windshield bracket module 40 fixed to the central upper end of a windshield 10 of a vehicle, the camera module 200 fixed to the windshield bracket module 40 and at which the pair of lenses 110A and 110B for capturing forward images of the vehicle are disposed to be laterally spaced apart from each other, the integral cover 400 coupled to the windshield bracket module 40 for concealing the appearance of the camera module 200, and a rearview mirror 300 coupled to a lower portion of the integral cover 400 via the supporter 310.

Unlike the first and second embodiments, one feature of the third embodiment of the present invention resides in the fact that the rearview mirror 300 is coupled to an outer side of the integral cover 400 which does not have any influence on the ranges of angles of view of the first and second lenses 110A and 110B.

In this embodiment, the rearview mirror 300 may be positioned below or behind the integral cover 400.

To this end, the integral cover 400 may be provided thereunder with a coupling member 410 protruding downward such that an end of the supporter 310 is coupled to the integral cover 400 via a ball joint 320.

Although not shown in the drawings, the vehicle front camera module assembly 100 having an integrated rearview mirror according to the third embodiment of the present invention may further include a rearview mirror moving unit which is disposed in the coupling member 410 to move the rearview mirror 300 and thus to adjust a reflection angle of the rearview mirror 300 by user manipulation.

Although the rearview mirror moving unit may be embodied as a common electric motor, the rearview mirror moving unit may, of course, adopt any driving unit capable of rotating an end of the supporter 310 coupled to the coupling member 410 via the ball joint 320 to adjust a reflection angle of the rearview mirror 300 without being limited to the electric motor.

As illustrated in FIG. 8, the rearview mirror 300 may be foldably coupled to a lower surface of the integral cover 400, regardless of embodiment. In the case that the rearview mirror 300 is foldably coupled to the lower surface of the integral cover 400, the integral cover 400 may be provided at a lower surface thereof with a reception member 420 for accommodating the rearview mirror 300 on the lower surface of the integral cover 400.

The rearview mirror may further include a mirror body and a display panel for displaying an image captured by the camera module 200.

The rearview mirror 300 may be coupled to a lower end of the coupling member 410 via the ball joint 320 to allow adjustment of a reflection angle of the rearview mirror 300. The fact that a reflection angle of the rearview mirror 300 can be adjusted is meaningful not only in that the rearview mirror 300 serves as a mirror for reflecting a rear view image of a vehicle and projecting the image to a driver but also in that a display angle of a display surface may be adjusted so as to be more easily viewed by a driver or a passenger when the rearview mirror 300 outputs an image captured by the camera module 200.

Since the mirror body of the rearview mirror 300 is coupled to the lower end of the supporter 310 via the ball joint 320, the display surface of the display panel may be advantageously adjusted to a desired angle by a driver or a passenger.

Since the sensors, the camera module 200 and the rearview mirror 300 are operated by supply of power, the vehicle front camera module assembly 100 having an integrated rearview mirror according to the present invention may include a wire 500 through which power from a power supply (not shown) is supplied to the components.

As illustrated in FIGS. 5A and 6B, the wire 500, which is disposed in a roof inner panel, extends into the integral cover 400 and is sequentially connected to the camera module 200 and the sensors to supply power thereto. Subsequently, the wire 500 extends through the supporter 310 and the ball joint 320 and is connected to the display panel. Since the wire 500 is provided as a single wire, it is possible to efficiently supply power to electric components in the integral cover 400 and the rearview mirror 300 from a power supply of a vehicle body without a need for complicated wiring.

As described herein, the housing including the windshield bracket module 40 and the integral cover 400 provides a mounting point for the rearview mirror 300 that is in front of the pair of lenses 110A and 110B; however, the rearview mirror 300 and its mounting arrangement including the supporter 310 does not interfere with angles of view of the pair of lenses 110A and 110B.

As specifically described above, the vehicle front camera module integrated with a rearview mirror according to the preferred embodiments of the present invention may provide various effects.

1) The camera module and the rearview mirror are integrally fabricated, and an image captured by the camera module is selectively displayed through the rearview mirror, thus reducing the total number of components.

2) The camera module and the rearview mirror are integrally fabricated in such a manner as not to interfere with respective angles of view of the pair of stereo type lenses, thus enabling more compact design of products.

3) The integral construction of the camera module and the rearview mirror enables safe driving by elimination of causes of interference with a forward visual field.

The vehicle front camera module integrated with a rearview mirrors according to the preferred embodiments of the present invention have been described in detail with reference to the accompanying drawings. However, the present invention is not limited to the preferred embodiments set forth herein, and those skilled in the art will appreciate that various modifications, additions and substitutions are possible, without departing from the scope and spirit of the present invention. Therefore, the true scope of the present invention should be interpreted by the accompanying claims.

What is claimed is:

1. A vehicle front camera module assembly, comprising:
a housing including a windshield bracket module configured to be attached to a central upper area of a windshield of a vehicle;
a camera module fixed to the windshield bracket module, the camera module including a pair of lenses laterally spaced apart from each other for viewing a forward image;
a rearview mirror;
a supporter connecting the rearview mirror to the housing, the supporter being fixed at an upper end thereof to the windshield bracket module;
an integral cover coupled to the windshield bracket module to conceal the camera module and the upper end of the supporter from a vehicle interior; and
a cover member detachably coupled to the integral cover for covering a connection between the supporter and the rearview mirror,
wherein the supporter and the rearview mirror do not interfere with respective angles of view of the pair of lenses.

2. The vehicle front camera module assembly according to claim 1, wherein the supporter is connected to the housing at a point located forwardly of the pair of lenses.

3. The vehicle front camera module assembly according to claim 1, further comprising a pair of light shield members laterally spaced apart from each other and disposed in front of the pair of lenses to define angles of view of the pair of lenses, respectively, while blocking introduction of light from outside of the angles of view,
wherein the supporter extends between the pair of light shield members.

4. The vehicle front camera module assembly according to claim 3, wherein the supporter is connected to the windshield bracket module at a point located forwardly of the pair of lenses and extending downward from the windshield bracket module.

5. The vehicle front camera module assembly according to claim 3, wherein the windshield bracket module comprises a windshield bracket, and
wherein the supporter connected to the rearview mirror includes an end portion fixed to the windshield bracket.

6. The vehicle front camera module assembly according to claim 5, wherein the end portion of the supporter is disposed behind front ends of the pair of light shield members.

7. The vehicle front camera module assembly according to claim 6, wherein the integral cover coupled to the windshield bracket module to conceal the camera module and the end portion of the supporter from a vehicle interior.

8. The vehicle front camera module assembly according to claim 7, wherein the cover member is detachably coupled to the integral cover to permit connection of the supporter to the windshield bracket.

9. The vehicle front camera module assembly according to claim 3, wherein the windshield bracket module comprises a light shield bracket to which the pair of light shield members are fixed, and
wherein the supporter connected to the rearview mirror includes an end portion fixed to the light shield bracket.

10. The vehicle front camera module assembly according to claim 9, wherein the end portion of the supporter is disposed behind front ends of the pair of light shield members.

11. The vehicle front camera module assembly according to claim 10, wherein the integral cover is coupled to the windshield bracket module to conceal the camera module and the end portion of the supporter from a vehicle interior.

12. The vehicle front camera module assembly according to claim 11, wherein the cover member is detachably coupled to the integral cover to permit connection of the supporter to the light shield bracket.

13. The vehicle front camera module assembly according to claim 1, wherein the rearview mirror comprises a display panel for displaying an image captured by the camera module.

14. The vehicle front camera module assembly according to claim 13, wherein the rearview mirror is coupled to a lower end of the supporter to permit adjustment of a reflection angle of the rearview mirror, and
wherein the display panel is supplied with power through a wire passing through the supporter and connected to the display panel.

15. The vehicle front camera module assembly according to claim 1,
wherein the supporter connected to the rearview mirror includes an end portion fixed to the integral cover.

16. The vehicle front camera module assembly according to claim 15, further comprising a ball joint for coupling the supporter to a lower portion of the integral cover.

17. The vehicle front camera module assembly according to claim 15, wherein the rearview mirror is foldably provided at a lower surface of the integral cover.

18. The vehicle front camera module assembly according to claim 17, wherein the integral cover comprises a reception member formed at the lower surface thereof at which the rearview mirror is seated when the rearview mirror is folded.

19. The vehicle front camera module assembly according to claim 15, wherein the rearview mirror is disposed behind the integral cover.

20. The vehicle front camera module assembly according to claim 15, wherein the rearview mirror is coupled to the integral cover in such a manner as to allow adjustment of a reflection angle of the rearview mirror by user manipulation.

* * * * *